United States Patent

[11] 3,559,563

| [72] | Inventors | Mortimer W. Brenner<br>Scarsdale;<br>Albert R. Erda, Armonk, N.Y. |
|---|---|---|
| [21] | Appl. No. | 729,319 |
| [22] | Filed | May 15, 1968 |
| [45] | Patented | Feb. 2, 1971 |
| [73] | Assignee | Glass Container Manufacturers Institute, Inc.<br>New York, N.Y.<br>a corporation of Ohio |

[54] BOTTLING APPARATUS AND METHOD
18 Claims, 11 Drawing Figs.
[52] U.S. Cl. .................................................. 99/275,
53/111, 53/127, 53/167
[51] Int. Cl. ................................................ B67c 7/00,
B65b 55/06, B65b 63/08
[50] Field of Search ........................................... 53/112,
127, 167; 99/79, 275

[56]  References Cited
UNITED STATES PATENTS

| 1,270,797 | 7/1918 | Dunkley | 53/112 |
| 1,348,341 | 8/1920 | Winkley | 53/167X |
| 1,889,629 | 11/1932 | Bohmer | 53/112X |
| 2,775,079 | 12/1956 | Sarofeen | 53/127X |
| 3,058,276 | 10/1962 | Palma | 53/167 |
| 3,242,636 | 3/1966 | Evanson | 53/167X |
| 3,090,293 | 5/1963 | Plock | 99/275 |
| 3,505,787 | 4/1970 | Tiews | 53/247X |

*Primary Examiner*—Wayne A. Morse, Jr.
*Attorney*—Kenyon & Kenyon Reilly Carr & Chapin

ABSTRACT: A bottling apparatus is disclosed wherein bottles disposed in rows of bottle-receiving pockets in an intermittently driven conveyor are passed through cleaning, charging, filling, sealing and warming or pasteurizing stations, wherein a predetermined number of rows of pockets are held stationary in each station during the processing thereof. The apparatus is capable of processing bottles at a high rate of speed with a minimum of labor, breakage and floor space.

PATENTED FEB 2 1971

INVENTORS
MORTIMER W. BRENNER
ALBERT R. ERDA
BY Kenyon & Kenyon
ATTORNEYS

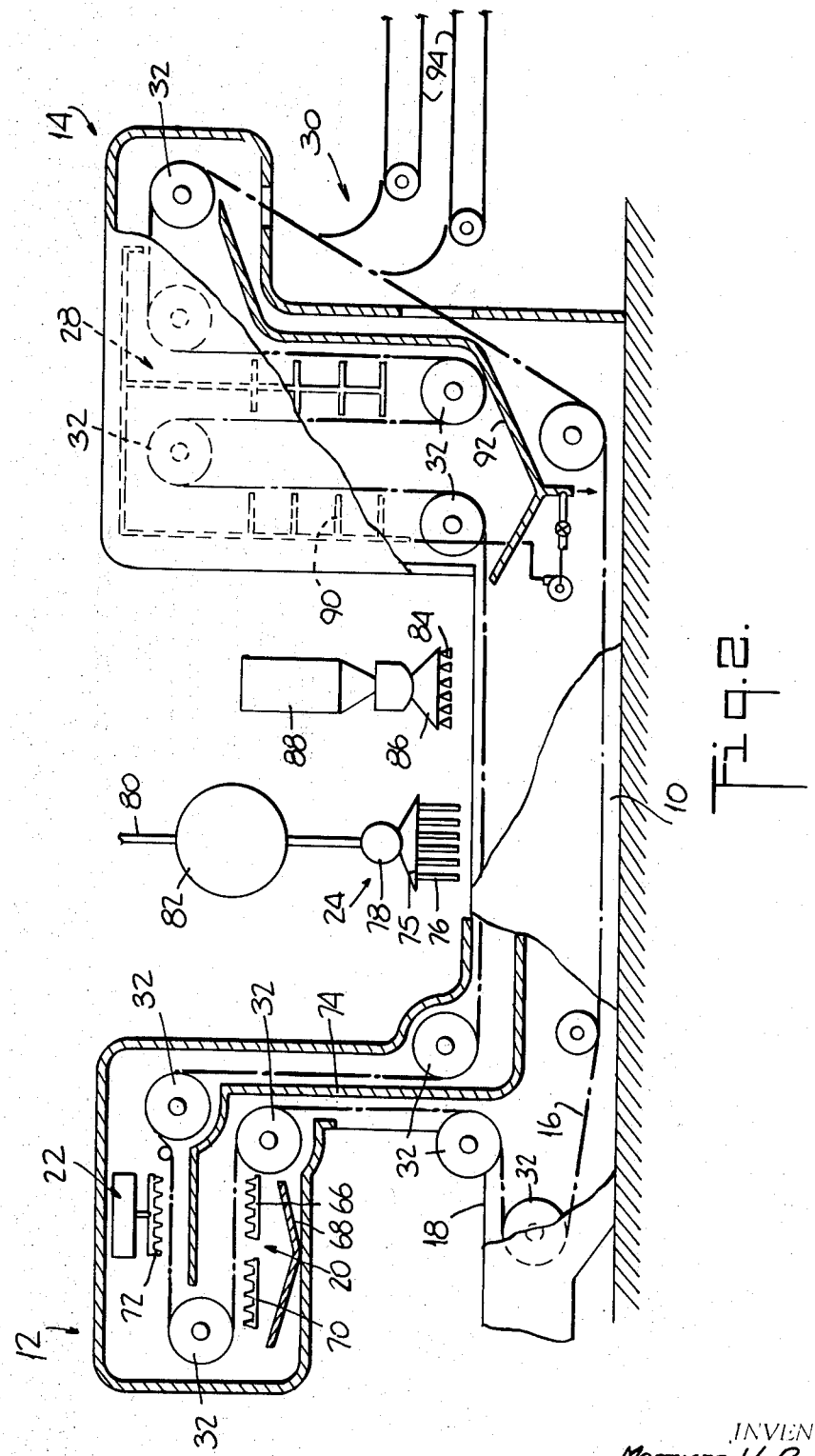

INVENTORS
MORTIMER W. BRENNER
ALBERT R. ERDA
BY
Kenyon & Kenyon
ATTORNEYS

BOTTLING APPARATUS AND METHOD

This invention relates to a method and apparatus for filling bottles. More particularly, this invention is concerned with a method and apparatus for filling bottles with liquids, and especially carbonated beverages such as beer and soft drinks at high rates.

Present bottling systems comprise several separate machines, e.g., washers, fillers, cappers, labellers and the like, many of which are capable of processing only a single bottle at a time. Improvements in such systems have generally centered on the individual components, but, with the exception of the use of conveyor systems between the components, little attention has been paid to true integration of the various operations.

As presently designed, most components are incapable of processing bottles at rates of 1,000—2,000 units per minute or more. For example, most fillers capable of processing more than one bottle at a time are of the rotary type, and cannot be enlarged to process bottles at high rates without resorting to overly large diameters. Moreover, severe complications arise in feeding bottles to and discharging bottles from such a rotary filler. In particular, it would be difficult to effect efficient transfer of the bottles without impact damage to and from the rotary filler at the high rates required.

Another disadvantage of the present systems is the high labor requirement resulting from the use of separate pieces of equipment. Still another problem is that of correlating the processing rates of the various elements so that all elements run at full capacity without causing an accumulation of partially processed bottles. Finally, because of the use of separate pieces of equipment and interconnecting conveyors, the systems presently in use occupy considerable floor area.

It is an object of this invention to provide means for cleaning, filling and sealing bottles at high unit rates.

It is a further object of this invention to provide a compact high-speed bottling system which requires a minimum of operating personnel.

Still another object of this invention is to provide a high-speed means for processing bottles through a series of integrated operations while minimizing the number of transfer points between operations.

A still further object is to provide a means for processing bottles through a series of operations while avoiding bottle-to-bottle contact and maintaining physical control of the movement of the bottles at all times.

These and other objects of this invention which will be apparent from the ensuing specification, attached drawings and appended claims are achieved by use of apparatus comprising:

a. an endless conveyor having bottle receiving and carrying pockets, which pockets are aligned in transverse rows;
b. means for intermittently advancing the conveyor through a series of work stations, whereby a predetermined number of said rows of pockets are positioned in each work station for a predetermined period of time;
c. means for loading bottles into the pockets of the conveyor;
d. means for cleaning the bottles;
e. optional means for charging the bottles with an inert gas;
f. means for filling the bottles;
g. means for sealing the bottles;
h. optional means for warming and/or sterilizing the bottles;
i. means for removing the bottles from the conveyor; and
j. optional means for delivering the bottles to subsequent processing operations such as labelling, packaging and the like.

To facilitate an understanding of the present invention, reference is made to the drawings of which:

FIG. 2 is a side elevation, partly in cross section, of the apparatus to FIG. 1.

FIG. 3 is a side elevation view, in section, of a pocket useful in the conveyor employed in the apparatus of FIG. 1.

Figure 1:
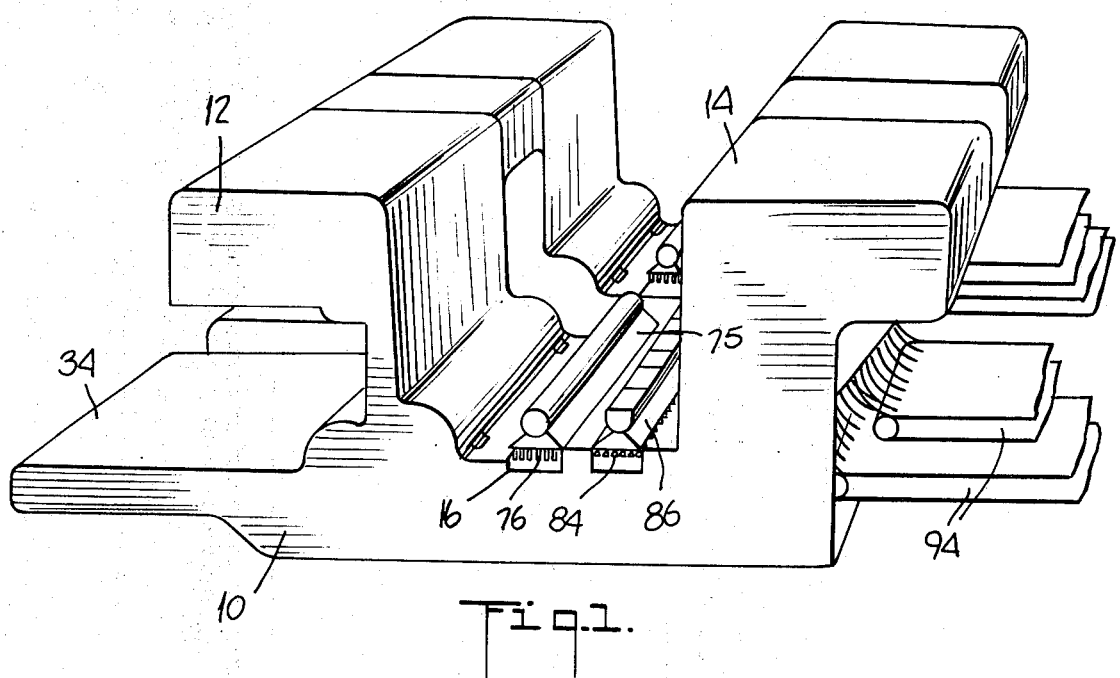
FIG. 1 is a perspective view of a preferred form of apparatus for automatically cleaning, charging, filling, sealing and heating bottles.

With reference to FIGS. 1 and 2, a major component of the present invention comprises a single machine for cleaning, charging, filling, sealing and heating bottles. This machine comprises a housing 10 forming two enclosures 12 and 14, and contains intermittently driven conveyor 16 passing through and between enclosures 12 and 14. Conveyor 16 is provided with transverse rows of bottle receiving and carrying pockets which are of dimensions sufficient to loosely receive a bottle. The internal surfaces of the pocket are desirably lined with a resilient, nonmetallic material to prevent marring of the bottle surface or breakage. The pockets are preferably open-bottomed for reasons which will be discussed below. A suitable pocket design is shown in FIG. 3.

With specific reference to FIG. 2, conveyor 16 passes through a series of work stations, i.e., bottle loading station 18, cleaning station 20, charging station 22, filling station 24, sealing station 26, warming station 28 and discharge station 30, and is guided by sprocket wheels 32, any one or more of which may be driven. Conveyor 16 is intermittently advanced through these stations a predetermined number of rows at a time and then stopped for a predetermined time period, during which period at least the steps of cleaning, charging, filling and sealing are carried out. The number of rows which the conveyor is advanced is not critical to this invention, but should be such that an optimum balance is obtained between the wear caused by too many strokes per unit time (too few rows per advance), and time lost for nonproductive pocket movement (too many rows per advance). At the present time, this optimum is believed to be from about three to about six rows.

The time period during which the conveyor is stationary is desirably the time required to fill all of the bottles in a predetermined number of rows. If longer periods of time are required for other steps, such as cleaning, or warming, the length of the conveyor in the work station can be adjusted to provide the necessary residence period.

The number of pockets in any row can vary depending upon the production rate desired. To achieve rates of the order of about 500 units per minute under presently contemplated conveyor speeds and processing times, there should be at least 12 pockets per row. Higher unit rates require a corresponding increase in the number of pockets per row, i.e., at least 24 pockets for 1,000 units per minute, at least 48 pockets for 2,000 units per minute etc. These pockets can be contained in one conveyor or in two or more conveyors in side-by-side relationship which may have a common or independent drives. If two or more lines are employed, each line should have a minimum of six pockets per row and the number of pockets in each row should be a multiple of six.

The bottles can be loaded into the pockets of conveyor 16 in any suitable manner, as by use of modified case packing devices. Loading can be effected either while conveyor 16 is stationary or in motion.

Figure 4:
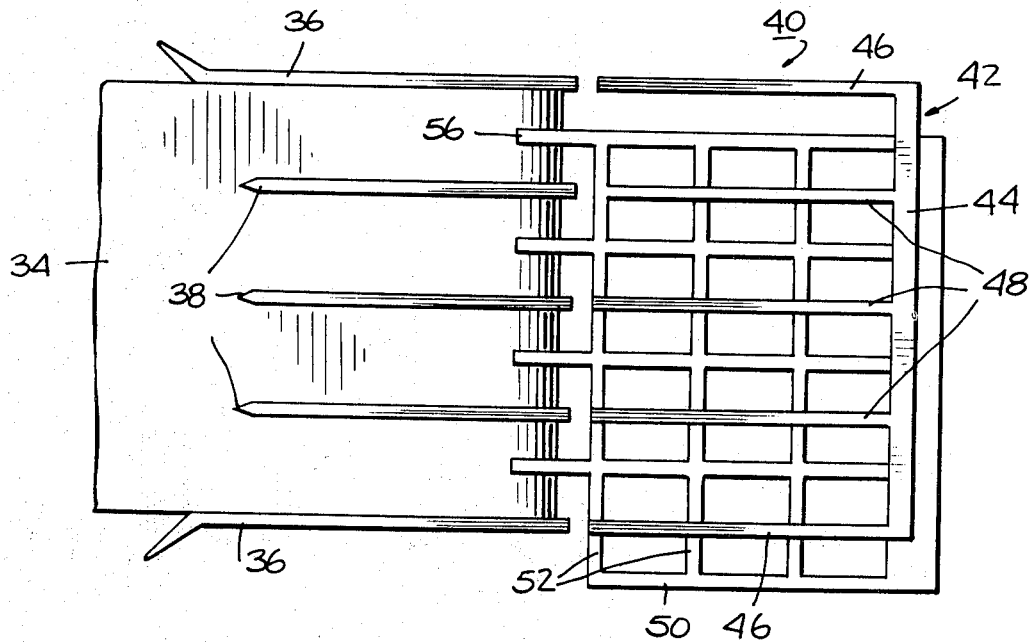
FIG. 4 is a plan view of an apparatus useful for loading bottles into the conveyor of the apparatus of FIG. 1.
Figure 5:
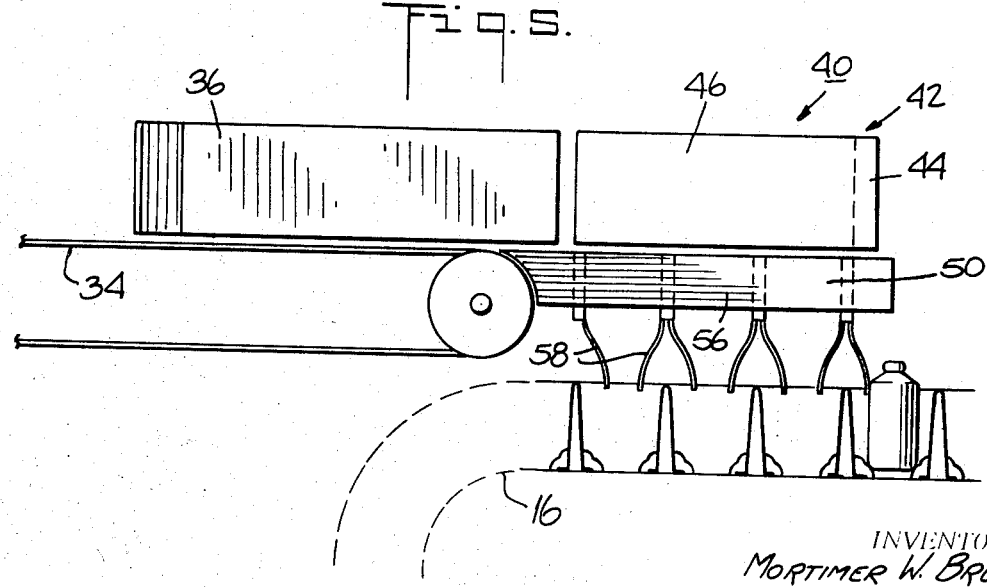
FIG. 5 is a side elevation view of the apparatus of FIG. 4.

In one embodiment, illustrated in FIGS. 4 and 5, there is employed feed conveyor 34, which is provided with side rails 36 and internal rails 38, the latter being suspended above the surface of conveyor 34, and pocket loading mechanism 40. Only four files are shown for purposes of illustration, it being understood that more files will be required in accordance with this invention. Loading mechanism 40 comprises a laterally movable carriage 42 having rear wall 44, sidewalls 46 and internal walls 48. Walls 46 and 48 are spaced apart a distance equal to the spacing between side rails 36 and internal rails 38. Loading mechanism 40 also comprises a stationary grid 50, the openings of which are aligned with and above the pockets of conveyor 16. Grid 50 is composed of vertical partitions 52 and 54 which are transverse of or parallel to the directions of conveyors 16 and 34. Parallel partitions 54 are provided with extensions 56, the outer ends of which are curved to conform to the curvature of the end of conveyor 34. The bottom edges of the partitions of grid 50 are provided with resilient fingers 58.

In operation, and with rails 36 and 38 and walls 46 and 48 aligned, bottles standing upright on conveyor belt 34 are carried forward between outer guide rails 36 and then rails 38 and are thereby formed into files. As the bottles move forward they are transferred from conveyor belt 34 to extensions 56 and then to parallel partitions 54, where the bottles are held in an upright position by rails 46 and 48. After loading mechanism 40 is supplied with a predetermined number of rows of bottles, and conveyor 16 has stopped beneath and in registry with grid 50, movable carriage 42 is shifted, thereby positioning the bottles contained therein over the holes in grid 50. The bottles fall through grid 50 and are directed by resilient fingers 58 to the pockets of conveyor 16. Fingers 58 are desirably formed so as to retard the rate of fall of the bottles. Then conveyor 16 is moved to transport the bottles away from loading station 18 and provide a new set of empty pockets, and movable carriage 42 is returned to its initial position to receive a new charge of bottles.

Figure 6:
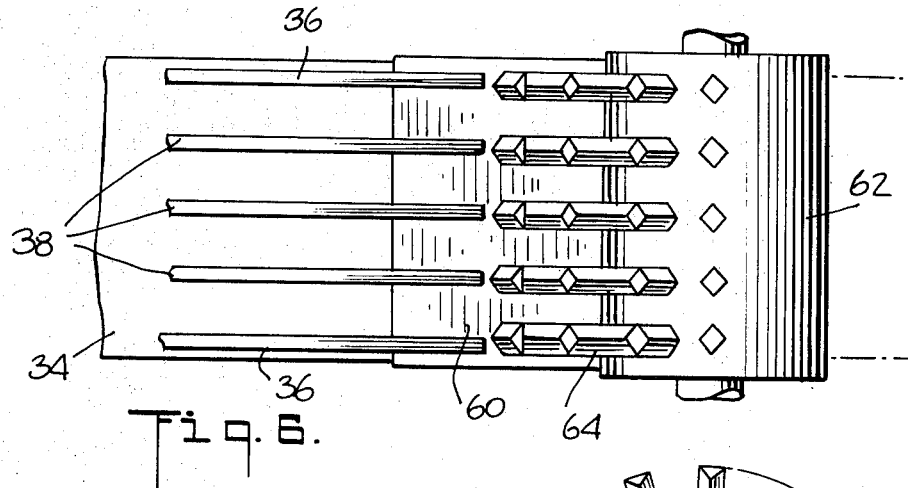
FIG. 6 is a plan view of a modified form of the apparatus of FIG. 4.
Figure 7:
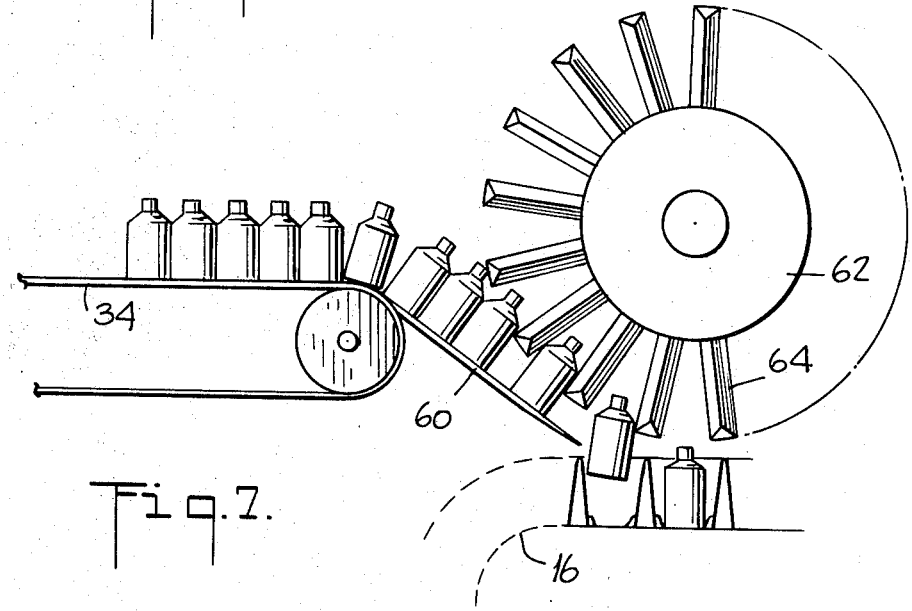
FIG. 7 is a side elevation of the apparatus of FIG. 6

In an alternative embodiment, and with reference to FIGS. 6 and 7, the bottles may be continuously loaded into the pockets while conveyor 16 is in motion. In this embodiment, loading mechanism 40 of FIGS. 4 and 5 is replaced by downwardly inclined chute 60 and rotor 62 having radial guides such as spokes 64 for directing the movement of successive rows of bottles into the transverse rows of pockets of conveyor 16. In this embodiment, rotor 62 is synchronized with conveyor 16, and is stopped when conveyor 16 stops.

Again with specific reference to FIG. 2, the bottles, after loading into the pockets of conveyor 16, are conveyed upwardly through enclosure 12 to cleaning station 20, where the bottles are inverted while being retained in the pockets of conveyor 16 by suitable retaining means, such as rails adapted to contact the shoulders of the bottles below the mouth of the bottles. The conveyor is halted so that a predetermined number of rows of bottles is superimposed over upward projecting nozzles 66 through which a suitable cleaning medium is introduced into the bottles. The medium can be a gas such as air which is employed to blow solid debris out of the bottle, or it can be a liquid, such as water, which may contain a detergent or other cleansing agent to wash the bottle. In a preferred form water at an elevated temperature, e.g., up to about 180°F., is employed.

In some instances it may be desirable to conduct the cleaning operation in two or more stages, as by the superimposition of the bottles over a second set of nozzles 70. If the first step is conducted with an aqueous cleansing agent the second step will be a rinsing step with clean water. In some instances, especially when it is desired to remove substantially all of the air from the bottle prior to filling, it is preferred to conduct the cleaning operation in several stages employing water at increasing temperatures of up to 212°F. in the last stage. Because of the expansion of the air contained in the bottle and the water vapor generated due to the elevated temperatures, the weight of the air in the bottle is considerably reduced. In a modification of this technique, steam can be employed in lieu of water, particularly in the last of several stages, to sterilize the bottles and to expel air.

After cleaning, conveyor 16 passes around sprocket wheel 32, whereby the bottles are in an upright position and, when further removal of air from the bottle is desired, transported to charging station 22 located in enclosure 12. The bottles in a predetermined number of rows are positioned under a like number of nozzles 72 through which an inert gas, e.g., carbon dioxide, nitrogen and the like, is passed into the bottles to displace the remaining air. When the apparatus of this invention is employed for filling bottles with carbonated beverages, carbon dioxide at an elevated pressure, for example from about 15 p.s.i.g. to about 250 p.s.i.g., is expanded into the bottles. In addition to displacing air the expanding gas causes the bottles to be cooled prior to the filling step. In a preferred embodiment discussed below the cooled gas also contracts, drawing in the inert atmosphere maintained from the charging station to the filling station.

The introduction of the inert gas into the bottles is effected in any convenient manner. Thus, a header carrying nozzles 72 can be lowered, thereby introducing the nozzles into the bottles, or when the conveyor pockets are open bottomed, pistons can be employed to push the bottles upwardly and around the nozzles, or both. Suitable nozzles are known to the art, as are valving and cooperating pistons useful therewith, and form no part of this invention.

After completion of the charging operation, the conveyor passes downwardly through enclosure 12 and, after passing sprocket wheel 32 to orient the bottles in an upright position, passes out of enclosure 12 to filling station 24. Desirably, baffle 74 is interposed between the conveyor flight leading to and through the rinsing station and the flight leading through the jetting station to the filling station to prevent contamination of the rinsed bottles by the incoming bottles. Baffle 74 is preferably attached to the walls of enclosure 12 to provide a substantially enclosed passageway extending from just prior to the charging station to just prior to the filling station. The air in this passageway has a high inert gas content due to the escape of the gas from the bottles, and thus hinders reentry of air to the bottles.

In filling station 24, a predetermined number of rows of bottles is halted under filling head 75 having as many filling nozzles 76 as there are bottles in the rows, and which are positioned over the open bottle mouths. The specific nozzles, valving and associated equipment is available to the art, and does not form a part of this invention. Thus, filling can be effected by gravity flow, or counterpressured filling. A desirable technique comprises the use of a noncounterpressured, gravity-flow filling system, both because of the reduced equipment, and thus maintenance, requirements and the reduced filling time resulting from the elimination of the counterpressuring step. Similarly, the nozzles can be lowered to the bottles and/or the bottles can be raised by pistons.

The liquid is fed to filling nozzles 76 from tank 78, which in turn is fed via line 80 from a remote storage tank, not shown. When the number of bottles being filled at one time is great, it is desirable to insert surge tank 82 in line 80 to facilitate uniform flow of liquid from the storage tank to the fillers.

After the bottles have been filled, conveyor 16 transports the bottles to sealing station 26, where the bottles in a predetermined number of rows are sealed, as by the application of the common crown closure by crown throats 84 on header 86 which are supplied from hopper 88. As with the charging and filling stations, the header may be lowered and/or the bottles may be raised for the sealing operation. Apparatus useful in this step is available to the art and does not form a part of this invention.

The sealed bottles are then transported to heating station 28 in enclosure 14, where the bottles are heated through a predetermined temperature cycle. For example, they may be warmed to a temperature above the dew point of the ambient air to prevent condensation on the bottles when stored in cases or cartons, or by the use of more elevated temperatures and/or longer times, the filled bottles may be pasteurized.

Heat for this step may be supplied in any convenient manner, as by radiant energy, electric or gas-fired heaters and the like. In the embodiment shown, heated water is sprayed through nozzles 90 onto the bottles in a series of vertical flights, in the course of which the orientation of the bottles is reversed several times to agitate the contents of the bottles and promote good heat transfer. The water is collected in basin 92, and recirculated to nozzles 90.

Figure 8:
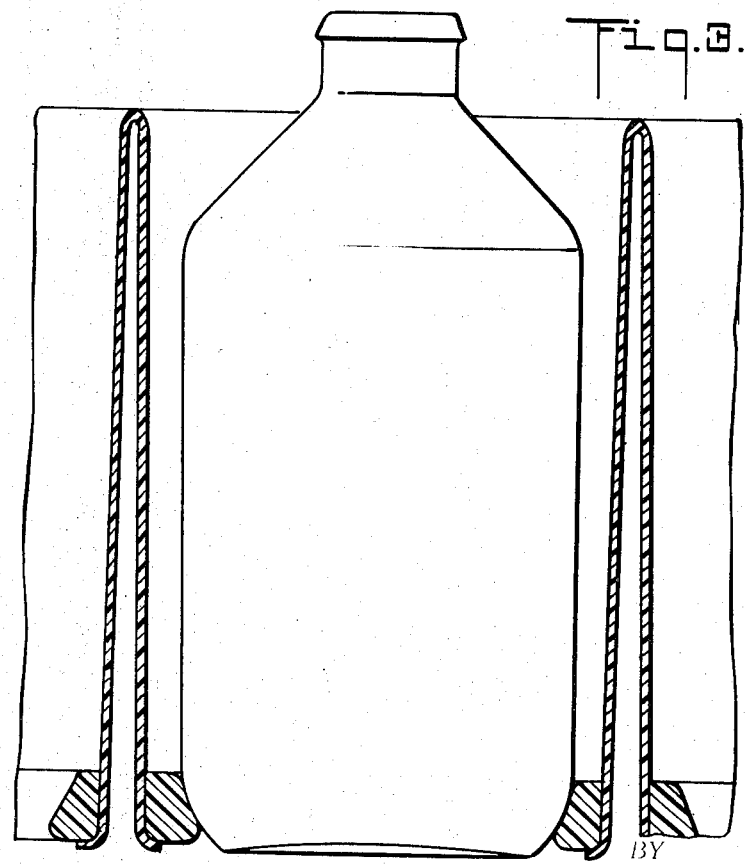
FIG. 8 is an elevation view of labelling apparatus useful in conjunction with the apparatus of FIG. 1.
Figure 9:
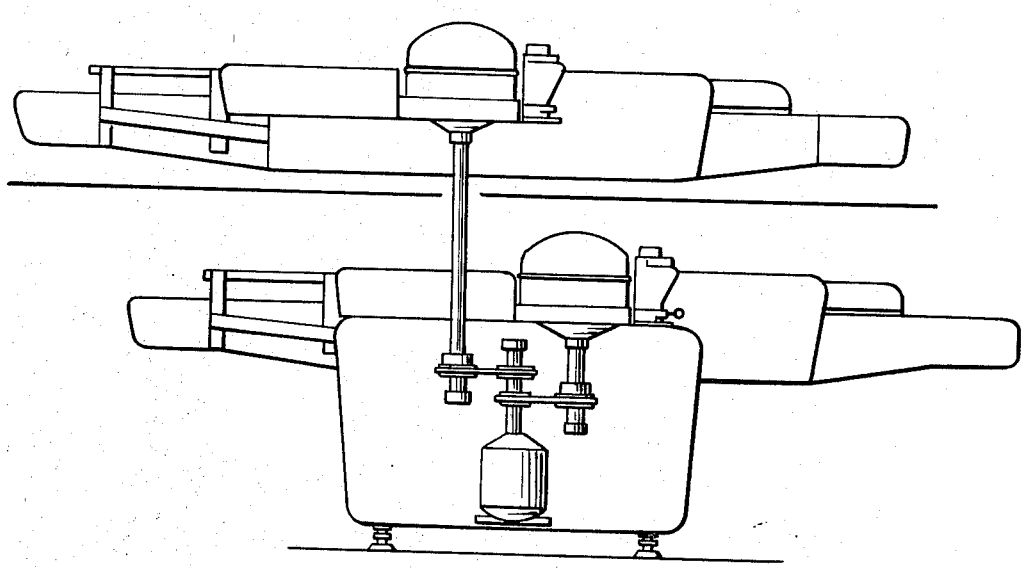
FIG. 9 is an elevation view of a modified form of the apparatus of FIG. 7.

Finally, the bottles are discharged from the conveyor pockets in discharge station 30, employing any suitable means, and then transported to storage or subsequent operations such as labelling, packaging, casing and the like. In the embodiment shown, predetermined numbers of rows of bottles are transferred alternately to two superimposed conveyors 94, which transport the bottles to two superimposed labellers of the type commonly employed. The labellers can operate off a common center shaft, as shown in FIG. 8, or can be driven by belts connected to a common drive shaft, as shown in FIG. 9. The latter embodiment permits the use of clutches to start or stop one unit without disturbing the state of the other unit.

As noted previously, each machine embodying the present invention can have a single conveyor, or can have two or more conveyors in side-by-side relationship, such as is shown in FIG. 1. The use of multiple conveyors has the advantage that a mechanical failure on one line will not require the entire operation to be shut down. In such an embodiment, the conveyors may be run as two independent lines as shown, or they may be alternately positioned in each work station, and a single head can be alternately positioned over each line, whereby one line is processed while a second line is being moved into position. Thus, nonproductive time is minimized, as are surges in the feeds to the various stations. Alternatively, and where independent lines are employed, different products and/or bottles can be processed.

Figure 10A:
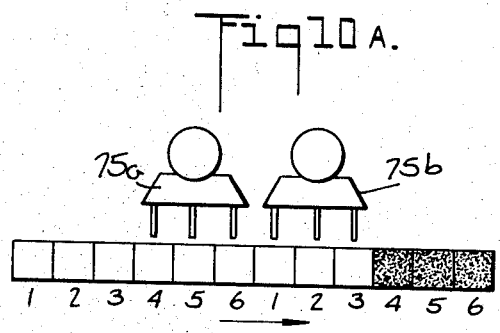
FIGS. 10a and 10b illustrate modifications of filling sequences which can be employed in accordance with this invention.
Figure 10B:
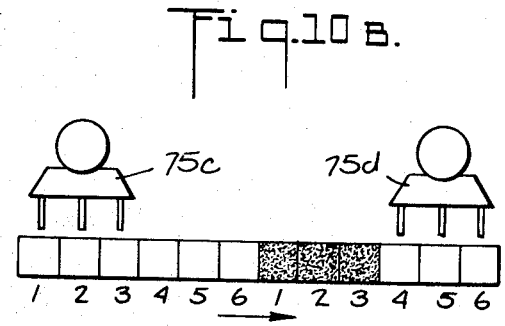
Figure 8:
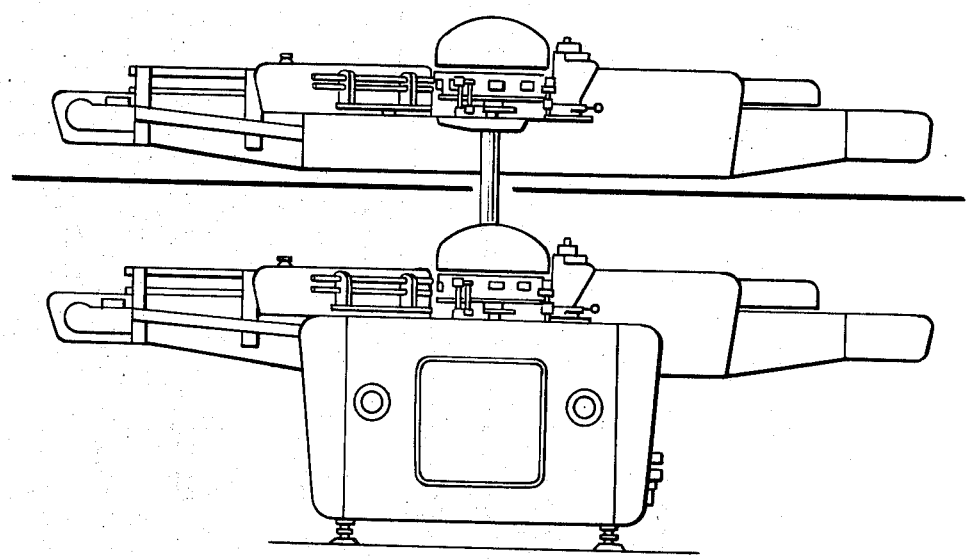

The number of rows of bottles which is processed simultaneously in each of work stations 20, 22, 24 and 26, or each subdivision of these work stations, such as the two rinsing substations of rinsing station 20, is desirably equal to the predetermined number of rows that conveyor 16 is advanced at a time. For example, when the conveyor is advanced six rows at a time, all of the bottles in the six rows positioned in each of stations 20, 22, 24 and 26 are simultaneously processed during the rest interval, and when the bottles are loaded on the conveyor while the conveyor is stopped, six rows of pockets are desirably simultaneously loaded. Other modes of operation are possible, however, and in some instances may be desirable. For example, a single work station may have two or more substations at which the same operation is performed, but on different sets of rows. To illustrate, and assuming the conveyor is advanced six rows at a time, filling station 24 may comprise two substations, each adapted to simultaneously fill three rows of bottles. These substations may fill adjacent three-row sets, as shown in FIG. 10a, or three-row sets separated by six rows as illustrated in FIG. 10b. In FIG. 10a the conveyor is advanced in the direction of the arrow and rows 4, 5 and 6 are positioned beneath the nozzles of header 75a and filled. The conveyor is then advanced six rows whereby the empty bottles of rows 1, 2 and 3 are positioned under the nozzles of header 75b and filled. In the modification of FIG. 10b, a similar operation is employed except that rows 1, 2 and 3 are filled in the first substation from header 75c and then rows 4, 5 and 6 are filled in the second substation through header 75d.

In still another modification, although a predetermined number of rows will be processed in one rest interval, they need not all be processed simultaneously. For example, at the present state of the art, crowners are able to process bottles faster than fillers. Assuming that the crowner can process bottles at more than twice the rate of the filler, and assuming the filler is simultaneously processing six rows, the crowner can be adapted to simultaneously process three rows, be itself shifted and simultaneously process another three-row set, and then to be returned to its original position.

Still other modifications will be apparent to one of ordinary skill in the art. Thus, although the particular arrangement illustrated in FIGS. 1 and 2 is preferred because of its compactness, (it is capable of processing up to about 2,000 bottles per minute while occupying a floor space of only about 55 feet by about 25 feet) other arrangements are obviously possible. In addition, although its use in conjunction with carbonated beverages has been emphasized, the present invention can be employed with any high volume liquid product, including ammonia water, liquid detergents and bleaches, still beverages and the like.

We claim:

1. Apparatus for filling glass bottles with a liquid comprising, in combination:
   a. An endless rectilinear conveyor having rows of a plurality of individual bottle receiving and carrying pockets disposed transversely of said conveyor and integral therewith the internal surfaces of said pockets being composed of a nonmetallic, resilient material to prevent marring of the bottle surface or breakage;
   b. A plurality of work stations including, in series:
      1. a first work station for cleaning said bottles,
      2. a second work station for filling said bottles,
      3. a third work station for sealing said bottles, and
      4. a fourth work station for heating said bottles.
   c. Means for advancing said conveyor sequentially through each of said work stations;
   d. Means for filling the pockets of said conveyor with bottles in a generally upright position;
   e. Means intermediate said pocket filling means and said first work station for inverting said conveyor, and means for retaining said bottles in said conveyor pockets which are inverted;
   f. Means in said first work station for introducing a cleaning medium simultaneously into a plurality of the inverted bottles in at least one row;
   g. Means intermediate said first and second work station for reinverting said conveyor whereby said bottles are in an upright position;
   h. Means in said second work station for simultaneously filling a plurality of the upright cleaned bottles in at least one row with a liquid;
   i. Means in said third work station for simultaneously sealing a plurality of the filled bottles in at least one row;
   j. Means in said fourth work station for heating the sealed bottles;
   k. Means for removing the cleaned, filled, sealed and heated bottles from the pockets of the conveyor; and
   l. Means for returning the bottle-free conveyor pockets to said means for filling said pockets with said bottles.

2. Apparatus according to claim 1 including a work station interposed between said first and second work stations at a point along said conveyor wherein said bottles are in an upright position having means for simultaneously charging the bottles contained in a predetermined number of rows with inert gas.

3. Apparatus according to claim 2 wherein said gas is carbon dioxide or nitrogen.

4. Apparatus according to claim 1 wherein said first work station includes a first substation having means to clean said bottles with water at an elevated temperature and a second substation having means for rinsing said bottles with water at a more elevated temperature or with steam.

5. Apparatus according to claim 2 including an enclosed passageway extending from just prior to said charging work station to just prior to said filling work station.

6. Apparatus according to claim 1 wherein said second work station includes means for filling said bottles under noncounterpressured flow.

7. Apparatus according to claim 1 wherein each row of said conveyor contains at least about 12 pockets.

8. Apparatus according to claim 7 including at least two conveyors in side-by-side relationship, each conveyor having the same number of rows as the other conveyors.

9. Apparatus according to claim 1 including a housing forming first and second spaced enclosures, said first work station is located in said first enclosure, said fourth work station is located in said second enclosure and said second and third work stations are located in an open work space intermediate said enclosures.

10. Apparatus according to claim 1 including means for advancing said conveyor intermittently through a plurality of said work stations, whereby a predetermined plurality of said rows are held stationary in said work stations for a predetermined period of time.

11. Apparatus according to claim 1 including means intermediate said first and second work stations for simultaneously charging a plurality of bottles in at least one row with carbon dioxide.

12. Apparatus according to claim 11 wherein said carbon dioxide charging means is located intermediate said reinverting means and said filling means.

13. Apparatus for filling glass bottles with a beverage at a high rate of speed including, in combination:
   a. a housing forming a first enclosure and a second enclosure and defining first, second and third open work spaces;
   b. a plurality of work stations including:
      1. a first work station in said first enclosure;
      2. a second work station in said second open work space;
      3. a third work station in said second open space; and
      4. a fourth work station in said second enclosure;
   c. an endless conveyor having rows of a plurality of individual bottle receiving pockets disposed transversely of and integral with said conveyor, the internal surfaces of said pockets being composed of a nonmetallic, resilient material to prevent marring of the bottle surface or breakage, said conveyor following a path through, in sequence, said first open work space, said second enclosure, said third open work space and then said first open work space;
   d. means for advancing said conveyor along said path;
   e. means in said first work space for filling the pockets of said conveyors with bottles in an upright position;
   f. means intermediate said first work space and said first work station for inverting said conveyor and means for retaining said bottles in the inverted pockets thereof;
   g. means in said first work station to retain said bottles in said conveyor pockets and means for introducing water simultaneously into a plurality of inverted bottles contained in at least one row of said conveyor;
   h. means intermediate said first and second work stations for reinverting said conveyor;
   i. means in said second work station for simultaneously filling the bottles contained in at least one row of said conveyor with said beverage;
   j. means in said third work station for simultaneously sealing the bottles in at least one row of said conveyor;
   k. means in said fourth work station for heating the sealed bottles and the contents thereof through a predetermined temperature cycle; and
   l. means in said third open work space for removing the bottles from the pockets of said conveyor.

14. Apparatus according to claim 13 including further work station in said first enclosure wherein said bottles are in an upright orientation and intermediate said reinverting means and said second work station, said further work station having means for charging carbon dioxide simultaneously to the bottles contained in at least one row of said conveyor.

15. Apparatus according to claim 14 wherein said endless conveyor follows a generally horizontal path with bottles upright through said first open work space, a generally vertical upward path to said first enclosure, a generally horizontal path with bottles inverted through said first work station, a generally horizontal path with bottles upright through said further work station, a generally vertical downward path to said second open work space, a generally horizontal path with bottles upright through said second open work space, a generally vertical, alternately upward and downward path through said second enclosure and a generally downwardly, inverted inclined path through said third open work space.

16. Apparatus according to claim 15 wherein said further work station, said first work station and said first open work space are in a substantially vertical alignment.

17. Apparatus according to claim 16 including a baffle cooperating with said first enclosure defining a substantially enclosed passageway surrounding said conveyor from a point between said first and further stations to said second open work space.

18. Apparatus according to claim 17 including at least two conveyors in side-by-side relationship.